UNITED STATES PATENT OFFICE.

SAMUEL H. LONGARD, OF HALIFAX, NOVA SCOTIA, CANADA.

REMEDY FOR DIPHTHERIA.

SPECIFICATION forming part of Letters Patent No. 230,141, dated July 20, 1880.

Application filed November 14, 1879. Patented in Canada November 5, 1879.

*To all whom it may concern:*

Be it known that I, SAMUEL H. LONGARD, of Halifax, in the county of Halifax, Province of Nova Scotia, and Dominion of Canada, have invented a new and useful compound to be used as a remedy for and a preventive of diphtheria, which compound, the preparation and manner of using thereof, is fully described and set forth in the following specification.

The nature of the invention consists in a composition resulting from the combination of and the operation upon the following ingredients: myrrh, sulphuric acid, (specific gravity 1.843,) rectified spirits of wine, and water.

To prepare the compound proceed as follows: Of moderately coarsely-powdered myrrh, take five-eighths of an ounce, avoirdupois; also take one-fourth of a pint of rectified spirits of wine, in three-fourths of which macerate the myrrh, and allow it to stand forty-eight hours. Add then the remaining one-fourth of the rectified spirits of wine, and filter the mixture perfectly. This shall be called "Liquid No. 1."

Of sulphuric acid, (specific gravity 1.843,) take one fluid dram, to which add gradually *aqua pura* (pure water) sufficient to make up four fluid ounces. This shall be called "Liquid No. 2."

Of pure water, take five (5) ounces, seven (7) drams, and forty-four (44) minims, to which add Liquid No. 2, and sixteen (16) minims of Liquid No. 1.

After the compounding and mixing have been thoroughly effected, filter carefully, and the product will be one-half pint of the remedy, imperial measure, more or less.

The remedy should be taken internally and in a diluted state, according to the directions, which are as follows:

For adults and children over fourteen years, three tea-spoonfuls of the remedy, to be put in a tumbler and add a sufficiency of pure water until the tumbler is one-half full.

For children from fourteen down to seven years, put two tea-spoonfuls of the remedy in a tumbler and add a sufficiency of pure water till the tumbler is one-half full.

For children from seven down to four years, put one tea-spoonful of the remedy in a tumbler and add a sufficiency of pure water till the tumbler is one-half full.

These doses are to be repeated once every three hours until the patient is relieved, and then three times a day until the cure is complete.

For children from four years down, put one tea-spoonful of the remedy in a tumbler and add a sufficiency of pure water until the tumbler is one-half full, and administer a tea-spoonful of the dilution once every two hours until a change is apparent, and then three times a day till cure is complete.

As a preventive, take one tea-spoonful of the remedy in half a tumbler of water twice a day.

Previous to using the remedy shake the bottle.

I claim—

A compound for the treatment of diphtheria, consisting of myrrh, rectified spirits of wine, sulphuric acid, (specific gravity 1.843,) and *aqua pura*, in about the proportions stated.

SAMUEL H. LONGARD.

Witnesses:
JOSEPH P. COSTIN,
W. D. HARRINGTON.